June 28, 1927.
W. W. MUIR
PISTON
Filed Nov. 19, 1926
1,634,037
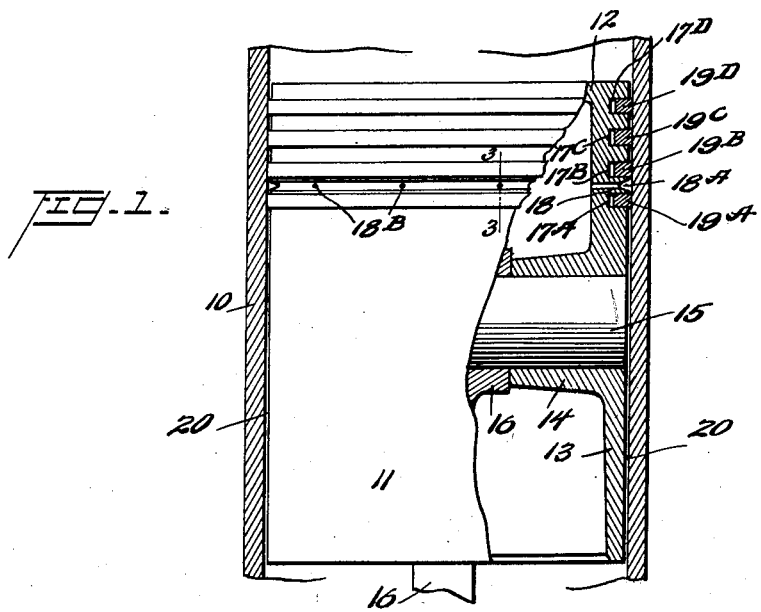
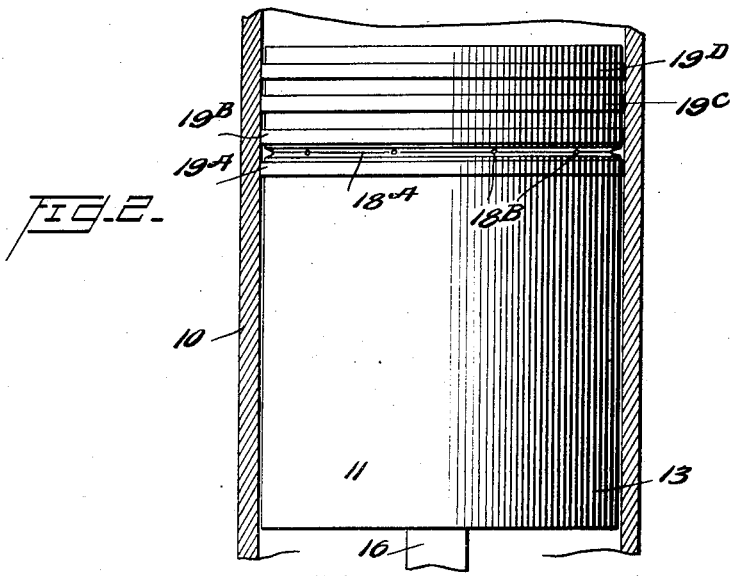
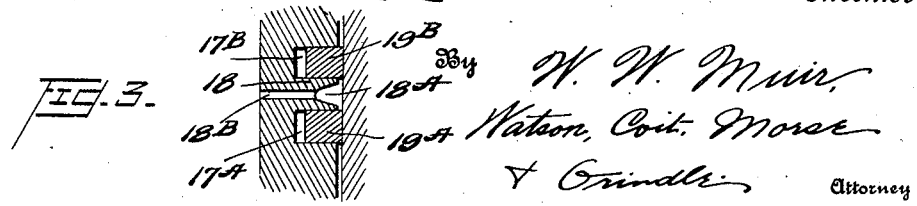

Patented June 28, 1927.

1,634,037

UNITED STATES PATENT OFFICE.

WELLINGTON W. MUIR, OF LOCKPORT, NEW YORK.

PISTON.

Application filed November 19, 1926. Serial No. 149,479.

This invention relates to pistons and particularly to pistons for use in internal combustion engines. It is well known that in modern high speed engines lubrication of the piston and cylinder walls is very important. It is also well known that great difficulty has been experienced in providing proper lubrication of the cylinder walls and at the same time preventing the passage of an excessive amount of oil into the combustion chamber where it is burned and converted into carbon thus causing fouling of the combustion chamber and spark plugs, sticking of the valves and other well known evils.

Various attempts have been made to devise a piston which would overcome these difficulties. Solution of the trouble has been sought by providing various arrangements of openings through the piston which are aimed to permit excess oil to escape from the exterior to the interior of the piston. In many cases grooves or chambers are provided on the exterior of the piston to catch excess oil scraped from the cylinder walls and return it through openings to the interior of the piston. But so far as I am aware none of these arrangements are altogether successful and in some cases as where oil receiving grooves or chambers are formed on or in the outer surface of the piston the results are often detrimental rather than helpful, as the oil accumulated in such grooves or chambers is very apt to be forced upwardly past the rings and find its way to the combustion chamber.

My present invention aims to overcome the foregoing difficulties, and as a result of extensive tests in practical operation I have found that my improved piston has given highly satisfactory results and has enabled me to practically eliminate the difficulties above mentioned due to oil escaping into the combustion chamber.

In the drawings accompanying this application and forming a part thereof, Figure 1 is a sectional view showing a cylinder with my improved piston therein, the piston being shown partly in section;

Figure 2 is a view similar to Fig. 1, the piston being shown in vertical elevation;

Figure 3 is a detailed sectional view taken on the line 3—3 of Fig. 1 and showing particularly the two lower compression rings and the narrow rib between the same.

Referring to the drawings by the reference numerals thereon, 10 indicates the cylinder in which the piston 11 is adapted to reciprocate. The piston includes a head 12 and a wall or skirt 13 which is integral with and depends from the head. The skirt of the piston is provided with a transverse wrist pin bore 14 in which the usual wrist pin 15 is closely fitted and on which is mounted the usual connecting rod 16.

Adjacent its upper end the piston 11 is provided on its exterior surface with a plurality of annular ring receiving grooves. The lowermost of these grooves, designated $17^a$ is disposed at some distance above the wrist pin bore 14. The second ring receiving groove, designated $17^b$ is disposed above the groove $17^a$. The two grooves $17^a$ and $17^b$ are arranged close to each other, the result being that a narrow rib 18 is formed between said grooves. The rib 18 is preferably provided on its exterior surface with a shallow V-shaped annular groove $18^a$ which extends around the piston. Extending from the bottom of the V-shaped groove $18^a$ through the rib 18 and into the interior of the piston are a plurality of relatively small passages $18^b$. These passages are preferably arranged horizontally and provide vents or passages between the exterior and interior of the piston. It will be seen that the rib 18 is integral with the skirt 13 and that except for the small openings therethrough it forms a solid metal wall between the grooves $17^a$ and $17^b$. Within the groove $17^a$ there is arranged a packing ring $19^a$ and a similar packing ring $19^b$ is disposed in the groove $17^b$. Above the groove $17^b$ I preferably provide other similar grooves $17^c$, $17^d$ in which the packing rings $19^c$ and $19^d$ are arranged.

It will be noted that the skirt 13 of the piston below the packing ring $19^a$ closely fits the walls of the cylinder 10. It will also be noted that below the ring $19^a$ the skirt of the piston is not perforated except, of course, for the wrist pin bore, but this bore is completely filled by the wrist pin 15. In other words, the space indicated at 20 between the piston and the wall of the cylinder below the packing ring $19^a$ is free from any direct communication with the interior of the piston. This space is long and narrow and extends for a considerable distance below the ring 19$^a$ and as before noted it has no direct communication with the interior of the piston. The purpose of this arrangement will later appear.

As previously stated the foregoing construction has proved highly successful in practical operation. This is due, I believe, to certain novel results accomplished by this construction. In the first place in order to prevent oil from passing into the combustion chamber it is essential to maintain the lower piston ring in constant contact with the cylinder wall. This cannot be done if the construction is such as to permit oil to accumulate below the ring for such oil is inevitably forced upwardly past the ring toward the combustion chamber. In my arrangement the long narrow space 20 prevents any substantial accumulation of oil below the ring 19$^a$. This space is so long and narrow that no large amount of oil can enter or remain therein and furthermore this space acts as a means to form a pneumatic cushion below the ring 19$^a$ to prevent accumulation of oil. That is, the air or gas trapped in said space will form an air cushion under the ring 19$^a$ which prevents oil in any substantial amount from accumulating below the ring and being forced past the same toward the combustion chamber.

Furthermore, extensive tests with internal combustion engines have shown that the pressure in the combustion chamber tends to compress the piston rings or force them away from the cylinder wall. In other words, during the power stroke the gases escape downwardly from the combustion chamber past the rings and cause the rings to be compressed slightly and thus forced out of contact with the cylinder wall. Due to the very rapid operation of the pistons in modern high speed engines the piston rings after being thus compressed do not have time to react and come in contact with the cylinder wall before a suction stroke occurs. The result is that during the suction stroke, oil passes upwardly past the compressed rings toward the combustion chamber. To state the matter another way, the time interval between the compression and suction strokes is so short that after being compressed by the gases the rings, because of the inertia of metal therein, will not react and move into contact with the cylinder wall so as to prevent upward passage of the oil during the suction strokes. Now if means are provided to prevent the highly compressed gases from affecting the lower ring, it is evident that this ring will remain in contact with the cylinder wall and prevent the upward passage of oil. My arrangement accomplishes this result.

The passages 18$^b$ permit the gases from the combustion chamber to escape into the interior of the piston without affecting the lower ring 19$^a$. This latter ring therefore remains in contact with the cylinder wall.

The passages 18$^b$ are made relatively small and are preferably arranged horizontally so that no substantial amount of oil will pass outwardly through the same during the suction stroke. Any oil that does pass out through these openings will be very largely caught in the groove 18$^a$ and will be forced back into the piston by the gases during the next compression stroke.

In order to accomplish the desired results to the best advantage it is preferable to make the rib 18 as narrow as possible consistent with the necessary strength as this arrangement reduces the space in which any oil may collect between the rings 19$^a$ and 19$^b$ and also insures that the gases passing downwardly around the upper rings shall readily escape to the interior of the piston. It has also been found preferable that the two rings 19$^a$ and 19$^b$ with the intervening narrow rib 18 be placed in the upper part of the piston above the wrist pin. This arrangement provides the maximum amount of narrow space below the ring 19$^a$ and permits the gases from the combustion chamber to escape into the piston much more readily than if the passage 18$^b$ were located farther down on the piston.

In short then, in my arrangement the ring 19$^a$ is kept in contact with the cylinder wall at all times due to the fact that a vent for the gases is provided above this ring and the further fact that oil cannot accumulate below this ring and force it away from the cylinder wall. The result is that oil is effectually prevented from passing upwardly into the combustion chamber so that with this improvement the cylinders are found to be practically free from carbon over very long periods of time.

Having thus described the invention, what is claimed as new and desired to be secured by Letters Patent is:

1. In an internal combustion engine, the combination of a cylinder, a hollow piston arranged therein and having a head and an integral depending skirt, said skirt having a wrist pin bore therein extending transversely thereof, the outer surface of said skirt having a circumferential groove therein above said wrist pin bore, said skirt also having a second circumferential groove therein above said first groove, said grooves being disposed relatively close to each other to provide a narrow rib therebetween which is integral with the skirt, a packing ring in each of said grooves, said narrow rib having a plurality of relatively small openings extending therethrough from its outer surface to the hollow interior of the piston, a plurality of packing rings disposed in said skirt above said second named groove, the space between said skirt and the wall of the cylinder below said first named packing ring being free from direct communication with the interior of said piston, whereby accumulation of oil below said first named ring is prevented.

2. In an internal combustion engine, the combination of a cylinder, a hollow piston arranged therein and having a head and an integral depending skirt, said skirt having a wrist pin bore therein extending transversely thereof, the outer surface of said skirt having a circumferential groove therein above said wrist pin bore, said skirt also having a second circumferential groove therein above said first groove, said grooves being disposed relatively close to each other to provide a narrow rib therebetween which is integral with the skirt, a packing ring in each of said grooves, said narrow rib having a plurality of relatively small openings extending substantially horizontally therethrough from its outer surface to the hollow interior of the piston, a plurality of packing rings disposed in said skirt above said second named groove, said skirt below said first named groove being arranged to closely fit the wall of said cylinder whereby a narrow space is formed between said skirt and wall, said space being free from direct communication with the interior of the piston.

3. In an internal combustion engine, the combination of a cylinder, a hollow piston arranged therein and having a head and an integral depending skirt, a narrow rib on the exterior of said skirt near the head of the piston, a packing ring disposed in said skirt below said rib and a second packing ring disposed in said skirt above said rib, said rib being integral with said skirt and forming a substantially solid narrow wall between said rings, additional packing rings disposed in said skirt above said second named ring, said rib having a plurality of relatively small passages extending directly therethrough from its outer surface to the hollow interior of the piston, said skirt below said first named packing ring being arranged to closely fit the wall of said cylinder whereby a narrow space is formed between said skirt and wall, said space being free from direct communication with the interior of the piston.

4. In an internal combustion engine, the combination of a cylinder, a hollow piston arranged therein and having a head and an integral depending skirt, a narrow rib on the exterior of said skirt near the head of the piston, a packing ring disposed in said skirt below said rib and a second packing ring disposed in said skirt above said rib, said rib having a shallow groove in its exterior surface and also having a plurality of relatively small passages connecting said groove with the interior of the hollow piston, additional packing rings disposed in said skirt above said second named ring, said skirt below said first named packing ring being arranged to closely fit the wall of said cylinder whereby a narrow space is formed between said skirt and wall, said space being free from direct communication with the interior of the piston.

In testimony whereof I hereunto affix my signature.

WELLINGTON W. MUIR.